United States Patent
Wiseman et al.

(10) Patent No.: US 8,681,982 B2
(45) Date of Patent: Mar. 25, 2014

(54) METHOD OF ESTABLISHING A QUANTUM KEY FOR USE BETWEEN NETWORK NODES

(75) Inventors: Simon Robert Wiseman, Malvern (GB); Richard Middleton Hicks, Malvern (GB); Brian Sinclair Lowans, Malvern (GB)

(73) Assignee: Qinetiq Limited, London (GB)

( * ) Notice: Subject to any disclaimer, the term of this patent is extended or adjusted under 35 U.S.C. 154(b) by 0 days.

(21) Appl. No.: 13/130,790

(22) PCT Filed: Dec. 2, 2009

(86) PCT No.: PCT/GB2009/002801
§ 371 (c)(1),
(2), (4) Date: May 24, 2011

(87) PCT Pub. No.: WO2010/064003
PCT Pub. Date: Jun. 10, 2010

(65) Prior Publication Data
US 2011/0228937 A1   Sep. 22, 2011

Related U.S. Application Data

(60) Provisional application No. 61/120,183, filed on Dec. 5, 2008.

(30) Foreign Application Priority Data

Dec. 5, 2008  (GB) ..................... 822253.1

(51) Int. Cl.
*H04L 29/06*   (2006.01)

(52) U.S. Cl.
USPC ............................ 380/255; 380/256; 380/259

(58) Field of Classification Search
USPC .......................... 380/255, 256, 259
See application file for complete search history.

(56) References Cited

U.S. PATENT DOCUMENTS 3,704,996 A   12/1972   Borner et al.
(Continued)

FOREIGN PATENT DOCUMENTS

EP   0 583 115 A1   2/1994
(Continued)

OTHER PUBLICATIONS

Bechmann-Pasquinucci et al., "Quantum key distribution with trusted quantum relay", May 12, 2005, p. 1-13, University of Pavia; UNNI.IT.XP 002534289.

Bennett et al., "Quantum Cryptography: Public Key Distribution and Coin Tossing", International Conference on Computers, Systems & Signal Processing, Dec. 10-12, 1984, pp. 1-5, Bangalore, India.

(Continued)

*Primary Examiner* — Jeffrey Pwu
*Assistant Examiner* — Thong Truong
(74) *Attorney, Agent, or Firm* — Oliff PLC

(57) ABSTRACT

A method of establishing a quantum key for use between a first network node (QNode1) and a second network node (QNode3) in a network for carrying out quantum cryptography includes a key agreement step carried out by a third node (QNode2) and the second node (QNode3) and a subsequent authentication step carried out by the first and second nodes directly. As the key agreement step does not involve QNode1, another key agreement step may be simultaneously performed by another pair of network nodes QNode4, QNode5 to agree a quantum key for use by network nodes QNode1 and QNode5. The invention allows respective quantum keys to be established between a network node and each of a set of other nodes more rapidly than is the case if each quantum key is established serially by key agreement and authentication steps.

5 Claims, 3 Drawing Sheets

(56) References Cited

U.S. PATENT DOCUMENTS

| | | | |
|---|---|---|---|
| 4,291,939 A | 9/1981 | Giallorenzi et al. | |
| 4,691,984 A | 9/1987 | Thaniyavarn | |
| 4,775,971 A | 10/1988 | Bergmann | |
| 4,807,952 A | 2/1989 | Jaeger et al. | |
| 5,150,436 A | 9/1992 | Jaeger et al. | |
| 5,157,754 A | 10/1992 | Bierlein et al. | |
| 5,166,991 A | 11/1992 | Jaeger et al. | |
| 5,410,625 A | 4/1995 | Jenkins et al. | |
| 5,428,698 A | 6/1995 | Jenkins et al. | |
| 5,479,514 A | 12/1995 | Klonowski | |
| 5,481,636 A | 1/1996 | Fukuda et al. | |
| 5,566,257 A | 10/1996 | Jaeger et al. | |
| 5,757,912 A | 5/1998 | Blow | |
| 5,768,378 A | 6/1998 | Townsend et al. | |
| 5,878,142 A | 3/1999 | Caputo et al. | |
| 5,999,548 A | 12/1999 | Mori et al. | |
| 6,028,935 A | 2/2000 | Rarity et al. | |
| 6,145,079 A | 11/2000 | Mitty et al. | |
| 6,240,514 B1 | 5/2001 | Inoue et al. | |
| 6,717,708 B2 | 4/2004 | Prosyk | |
| 6,798,795 B2 | 9/2004 | Yoo | |
| 6,806,986 B2 | 10/2004 | Asobe et al. | |
| 7,068,790 B1 | 6/2006 | Elliott | |
| 7,155,078 B2 | 12/2006 | Welch et al. | |
| 7,162,107 B2 | 1/2007 | Bull et al. | |
| 7,181,114 B2 | 2/2007 | Lee et al. | |
| 7,242,775 B2 | 7/2007 | Vig et al. | |
| 7,242,821 B2 | 7/2007 | Bull et al. | |
| 7,248,695 B1 | 7/2007 | Beal et al. | |
| 7,274,791 B2 | 9/2007 | Van Enk | |
| 7,289,688 B2 | 10/2007 | Bull et al. | |
| 7,430,295 B1 * | 9/2008 | Pearson et al. | 380/256 |
| 7,460,670 B1 | 12/2008 | Elliott | |
| 7,515,716 B1 | 4/2009 | Elliott | |
| 7,515,801 B2 | 4/2009 | McCaughan et al. | |
| 7,596,318 B2 | 9/2009 | Han et al. | |
| 7,627,126 B1 | 12/2009 | Pikalo et al. | |
| 7,646,873 B2 | 1/2010 | Lee et al. | |
| 7,706,535 B1 | 4/2010 | Pearson et al. | |
| 7,760,883 B2 | 7/2010 | Kuang | |
| 7,864,958 B2 * | 1/2011 | Harrison et al. | 380/256 |
| 7,865,048 B2 | 1/2011 | McCaughan et al. | |
| 8,488,790 B2 | 7/2013 | Wellbrock et al. | |
| 2002/0025046 A1 | 2/2002 | Lin | |
| 2002/0087862 A1 | 7/2002 | Jain et al. | |
| 2003/0210912 A1 | 11/2003 | Leuthold et al. | |
| 2003/0214991 A1 | 11/2003 | Wiedmann et al. | |
| 2004/0032954 A1 | 2/2004 | Bonfrate et al. | |
| 2004/0034776 A1 | 2/2004 | Fernando et al. | |
| 2004/0109564 A1 | 6/2004 | Cerf et al. | |
| 2004/0184603 A1 | 9/2004 | Pearson et al. | |
| 2004/0184615 A1 | 9/2004 | Elliott et al. | |
| 2004/0252957 A1 | 12/2004 | Schmidt et al. | |
| 2005/0078826 A1 | 4/2005 | Takeuchi | |
| 2005/0135620 A1 | 6/2005 | Kastella et al. | |
| 2005/0190921 A1 | 9/2005 | Schlafer et al. | |
| 2005/0249352 A1 | 11/2005 | Choi et al. | |
| 2005/0259825 A1 | 11/2005 | Trifonov | |
| 2005/0286723 A1 | 12/2005 | Vig et al. | |
| 2006/0002563 A1 | 1/2006 | Bussieres et al. | |
| 2006/0031828 A1 | 2/2006 | Won et al. | |
| 2006/0059343 A1 * | 3/2006 | Berzanskis et al. | 713/171 |
| 2006/0062392 A1 | 3/2006 | Lee et al. | |
| 2006/0067603 A1 | 3/2006 | Bull et al. | |
| 2006/0083379 A1 | 4/2006 | Brookner | |
| 2006/0290941 A1 | 12/2006 | Kesler et al. | |
| 2007/0014415 A1 | 1/2007 | Harrison et al. | |
| 2007/0016534 A1 | 1/2007 | Harrison et al. | |
| 2007/0065154 A1 | 3/2007 | Luo et al. | |
| 2007/0065155 A1 | 3/2007 | Luo et al. | |
| 2007/0071245 A1 | 3/2007 | Kuang | |
| 2007/0074277 A1 | 3/2007 | Tofts et al. | |
| 2007/0076884 A1 | 4/2007 | Wellbrock et al. | |
| 2007/0101410 A1 | 5/2007 | Harrison et al. | |
| 2007/0104443 A1 | 5/2007 | Helmy | |
| 2007/0122097 A1 | 5/2007 | Schmidt et al. | |
| 2007/0123869 A1 | 5/2007 | Chin et al. | |
| 2007/0133798 A1 | 6/2007 | Elliott | |
| 2007/0160201 A1 | 7/2007 | Blom et al. | |
| 2007/0177735 A1 | 8/2007 | Mimih et al. | |
| 2007/0192598 A1 | 8/2007 | Troxel et al. | |
| 2008/0003104 A1 | 1/2008 | Betlach | |
| 2008/0013738 A1 | 1/2008 | Tajima et al. | |
| 2008/0031456 A1 | 2/2008 | Harrison et al. | |
| 2008/0144836 A1 | 6/2008 | Sanders et al. | |
| 2008/0147820 A1 | 6/2008 | Maeda et al. | |
| 2008/0175385 A1 | 7/2008 | Lee et al. | |
| 2008/0292095 A1 | 11/2008 | Vig et al. | |
| 2008/0317423 A1 | 12/2008 | Stepanov et al. | |
| 2009/0016736 A1 | 1/2009 | Beal et al. | |
| 2009/0074192 A1 | 3/2009 | Beal et al. | |
| 2009/0106551 A1 * | 4/2009 | Boren et al. | 380/259 |
| 2009/0175452 A1 * | 7/2009 | Gelfond et al. | 380/277 |
| 2009/0316910 A1 | 12/2009 | Maeda et al. | |
| 2010/0226659 A1 | 9/2010 | Nishioka et al. | |
| 2010/0290626 A1 | 11/2010 | Jenkins et al. | |
| 2010/0293380 A1 | 11/2010 | Wiseman et al. | |
| 2010/0299526 A1 | 11/2010 | Wiseman et al. | |
| 2010/0329459 A1 | 12/2010 | Wiseman et al. | |

FOREIGN PATENT DOCUMENTS

| | | |
|---|---|---|
| EP | 0 610 727 A1 | 8/1994 |
| EP | 1 503 328 A1 | 2/2005 |
| EP | 1 605 287 A2 | 12/2005 |
| EP | 1 633 076 A1 | 3/2006 |
| EP | 1 643 663 A1 | 4/2006 |
| EP | 1 833 009 A1 | 9/2007 |
| EP | 1 848 142 A2 | 10/2007 |
| EP | 1 865 656 A1 | 12/2007 |
| EP | 2 003 812 A2 | 12/2008 |
| EP | 2 081 317 A2 | 7/2009 |
| GB | 2 379 847 A | 3/2003 |
| GB | 2 397 452 A | 7/2004 |
| GB | 2 427 336 A | 12/2006 |
| GB | 2 453 471 A | 4/2009 |
| JP | A-2005-117511 | 4/2005 |
| JP | A-2005-268958 | 9/2005 |
| JP | A-2007-500370 | 1/2007 |
| JP | A-2007-053591 | 3/2007 |
| JP | A-2007-129562 | 5/2007 |
| WO | WO 92/11550 A1 | 7/1992 |
| WO | WO 92/11551 A1 | 7/1992 |
| WO | WO 92/11554 A2 | 7/1992 |
| WO | WO 92/11555 A1 | 7/1992 |
| WO | WO 95/07582 A1 | 3/1995 |
| WO | WO 97/44936 A1 | 11/1997 |
| WO | WO 02/15626 A1 | 2/2002 |
| WO | WO 03/015370 A2 | 2/2003 |
| WO | WO 03/065091 A2 | 8/2003 |
| WO | WO 2004/083915 A1 | 9/2004 |
| WO | WO 2004/083923 A1 | 9/2004 |
| WO | WO 2004/105289 A3 | 12/2004 |
| WO | WO 2005/012968 A1 | 2/2005 |
| WO | WO 2005/012970 A1 | 2/2005 |
| WO | WO 2006/031828 A2 | 3/2006 |
| WO | WO 2006/134290 A2 | 12/2006 |
| WO | WO 2007/023286 A1 | 3/2007 |
| WO | WO 2007/105834 A1 | 9/2007 |
| WO | WO 2007/121587 A1 | 11/2007 |
| WO | WO 2007/123869 A2 | 11/2007 |
| WO | WO 2008/003104 A1 | 1/2008 |
| WO | WO 2008/032048 A1 | 3/2008 |
| WO | WO 2008/146395 A1 | 12/2008 |
| WO | WO 2009/001226 A3 | 12/2008 |
| WO | WO 2009/093034 A3 | 7/2009 |
| WO | WO 2009/093036 A2 | 7/2009 |
| WO | WO 2009/093037 A1 | 7/2009 |
| WO | WO 2009/095644 A1 | 8/2009 |
| WO | WO 2009/141586 A1 | 11/2009 |
| WO | WO 2009/141587 A1 | 11/2009 |
| WO | WO 2010/049673 A1 | 5/2010 |

(56) References Cited

FOREIGN PATENT DOCUMENTS

| WO | WO 2010/064003 A1 | 6/2010 |
|---|---|---|
| WO | WO 2010/064004 A1 | 6/2010 |

OTHER PUBLICATIONS

Duligall et al., "Low cost and compact quantum key distribution", New Journal of Physics, Institute of Physics Publishing, Bristol, GB. vol. 8, No. 10, Oct. 2006, pp. 1-16, 2006, XP 020107565.

Elliott et al., "Building the quantum network", New Journal of Physics, Institute of Physics Publishing, Bristol, GB, vol. 4, 12 Jul. 12, 2002, pp. 46.1-46.12, XP 002271991.

Fernandez et al., "Gigahertz Clocked Quantum Key Distribution in Passive Optical Networks", Ieos Summer Topical Meetings, 2006 Digest of the Quebec City, Canada, Jul. 17, 2006, pp. 36-37, XP 010940123.

Fernandez et al., "Passive Optical Network Approach to Gigahertz-Clocked Multiuser Quantum Key Distribution", Journal of Quantum Electronics, vol. 43, No. 2, pp. 130-138, Feb. 2007.

Brassard et al., "Multi-User Quantum Key Distribution Using Wavelength Division Multiplexing", Université de Montréal, École, Polytechnique de Montréal, pp. 1-5, XP 002534322.

Gordeev et al., "Tunable electro-optic polarization modulator for quantum key distribution applicators", Optics Communications, vol. 234, pp. 203-210, Feb. 13, 2004.

Horikiri et al., "Quantum key distribution with a heralded single photon source", International Quantum Electronics Conference, 2005, pp. 1617-1618, Jul. 11, 2005.

Lee et al., "Quantum Authentication and Quantum Key Distribution Protocol", Korea University, Jan. 11, 2006, pp. 1-8, XP002534292.

Rao et al., "Nonlinear frequency conversion in semiconductor optical waveguides using birefringent, modal and quais-phase-matching techniques", Journal of Optics A: Pure and Applied Optics, vol. 6, pp. 569-584, 2004.

Ljunggren et al., "Authority-based user authentication in quantum key distribution", Physical Review A, vol. 62, pp. 022305-1-022305-7, Jul. 13, 2000, XP 002534291.

Kuhn, "A Quantum Cryptographic Protocal with Detection of Compromised Server", Quantum Information and Computation, vol. 5, No. 7, 2005, pp. 551-560, XP 002520284.

Kumavor et al., "Comparison of Four Multi-User Quantum Key Distribution Schemes Over Passive Optical Networks", Journal of Lightwave Technology, vol. 23, No. 1, pp. 268-276, Jan. 2005, XP 001227328.

Malis et al., "Improvement of second-harmonic generation in quantum-cascade lasers with true phase matching", Applied Physics Letters, vol. 84, No. 15, pp. 2721-2723, Apr. 12, 2004, XP 12061044.

Masanovic et al., "Design and Performance of a Monolithically Integrated Widely Tunable All-Optical Wavelength Converter with Independent Phase Control", IEEE Photonics Technology Letters, vol. 16, No. 10, pp. 2299-2301, Oct. 2004.

Menezes et al., "Handbook of Applied Cryptography", Chapter 13 Key Management Techniques, CRC Press LLC, 1997, pp. 547-553, XP 002520285.

Nambu et al., "BB84 Quantum Key Distribution System based on Silica-Based Planar Lightwave Circuits", Apr. 22, 2008, pp. 1-11.

Hwang et al., "Provably Secure Three-Party Authenticated Quantum Key Distribution Protocols", IEEE Transactions on Dependable and Secure Computing, vol. 4, No. 1, pp. 71-80, Jan.-Mar. 2007, XP 11165308.

Mo et al., "Quantum key distribution network with wavelength addressing", University of Science and Technology of China, Oct. 15, 2006, pp. 1-11, XP 002534290.

Nguyen et al., "802.11i Encryption Key Distribution Using Quantum Cryptography", Journal of Networks, vol. 1, No. 5, pp. 9-20, Sep./Oct. 2006, XP 002576733.

Moutzouris et al., "Second Harmonic Generation in GaAs/AlGaAs Waveguides with Femtosecond Pulses Near 1.55 μm Using Modal Phase Matching Technique", Lasers and Electro-Optics Europe, Conference Munich, Germany, Jun. 22-27, 2003, XP 010710252.

Jäger et al., "Modal dispersion phase matching over 7 mm length in overdamped polymeric channel waveguides", Applied Physics Letters, vol. 69, No. 27, pp. 4139-4141, Dec. 30, 1996, XP 12016922.

Yin et al., "Inegrated ARROW waveguides with hollow cores," Optics Express, Optical Society of America, Washington, DC, USA, vol. 12, No. 12, pp. 2710-2715, Jun. 14, 2004, XP 002363659.

Yariv, "Coupled-Mode Theory for Guided-Wave Optics", IEEE Journal of Quantum Electronics, vol. QE9, No. 9, pp. 919-933, Sep. 1973.

Rahmatian et al., "An Ultrahigh-Speed AlGaAs-GaAs Polarization Converter Using Slow Wave Coplanar Electrodes", IEEE Photonics Technology Letters, vol. 10, No. 5, pp. 675-677, May 1998, XP 11046059.

Finlayson et al., "Polarization Conversion in Passive Deep-Etched GaAs/AlGaAs Waveguides", Journal of Lightwave Technology, vol. 24, No. 3, pp. 1425-1432, Mar. 2006, XP 002459136.

Grossard et al., "AlGaAs-GaAs Polarization Converter with Electrooptic Phase Mismatch Control," IEEE Photonics Technology Letters, vol. 13, No. 8, pp. 830-832, Aug. 2001, XP 11047704.

Hall et al., "Optical Guiding and Electro-Optic Modulation in GaAs Epitaxial Layers, "Optics Communications, vol. 1, No. 9, pp. 403-405, Apr. 1970.

Haxha et al., "Analysis of polarization conversion in AlGaAs/GaAs electrooptic polarization converter", Optics Communications, vol. 262, pp. 47-56, 2006, XP 002459135.

Heaton et al., "Optimization of Deep-Etched, Single Mode GaAs/AlGaAs Optical Waveguides Using Controlled Leakage Into the Substrate", Journal of Lightwave Technology, vol. 17, No. 2, pp. 267-281, Feb. 1999.

Izuhara et al., "Low-voltage tunable TE/TM converter on ion-sliced lithium niobate thin film", Electronics Letters, vol. 39, No. 15, Jul. 24, 2003, XP 6020699.

Schlak et al., "Tunable TE/TM-Mode Converter on (001) In-P-Substrate", IEEE Photonic Technology Letters, vol. 3, No. 1, pp. 15-16, Jan. 1991.

Wang et al., "High Speed III-V Electrooptic Waveguide Modulators at $\lambda=1.3$ μm", Journal of Lightwave Technology, vol. 6, No. 6, pp. 758-771, Jun. 1988.

Kanamori et al., "Three-party Quantum Authenticated Key Distribution with Partially Trusted Third Party," Global Telecommunications Conference, 2008, IEEE Globecom 2008 Proceedings, Piscataway, NJ, USA, Nov. 30, 2008, pp. 1-5. XP 031370037.

Toliver et al., "Demonstration of 1550 nm QKD with ROADM-based DWDM Networking and the Impact of Fiber FWM", 2007 Conference on Lasers, XP 31231032.

Mar. 31, 2009 International Search Report issued in International Application No. PCT/GB2009/000190.

Mar. 31, 2009 Written Opinion of the International Searching Authority in International Application No. PCT/GB2009/000190.

May 16, 2008 British Search Report issued in Application No. GB0801408.6.

Jul. 14, 2009 International Search Report issued in Application No. PCT/GB2009/000189.

Jul. 14, 2009 Written Opinion of the International Searching Authority issued in Application No. PCT/GB2009/000189.

Aug. 3, 2010 International Preliminary Report on Patentability issued in Application No. PCT/GB2009/000179.

Jun. 2, 2009 International Search Report issued in Application No. PCT/GB2009/000179.

Jun. 2, 2009 Written Opinion of the International Searching Authority issued in Application No. PCT/GB2009/000179.

Apr. 24, 2008 British Search Report issued in Application No. GB0801492.0.

Jul. 28, 2009 International Search Report issued in Application No. PCT/GB2009/000186.

Jul. 28, 2009 Written Opinion of the International Searching Authority issued in Application No. PCT/GB2009/000186.

May 21, 2008 British Search Report issued in Application No. GB0801395.5.

Jul. 14, 2009 International Search Report issued in Application No. PCT/GB2009/001223.

Jul. 14, 2009 Written Opinion of the International Searching Authority issued in Application No. PCT/GB2009/001223.

(56) References Cited

OTHER PUBLICATIONS

Jul. 14, 2009 International Search Report issued in Application No. PCT/GB2009/001226.
Jul. 14, 2009 Written Opinion of the International Searching Authority issued in Application No. PCT/GB2009/001226.
Jul. 6, 2009 International Search Report issued in Application No. PCT/GB2009/001222.
Jul. 6, 2009 Written Opinion issued in Application No. PCT/GB2009/001222.
May 21, 2008 British Search Report issued in Application No. GB0801406.0.
Aug. 31, 2008 British Search Report issued in Application No. GB0801406.0.
Sep. 2, 2008 British Search Report issued in Application No. GB0801406.0.
Aug. 13, 2008 British Search Report issued in Application No. GB0809038.3.
Aug. 13, 2008 British Search Report issued in Application No. GB0809044.1.
Aug. 14, 2008 British Search Report issued in Application No. GB0809045.8.
Jan. 23, 2009 British Search Report issued in Application No. GB0819665.1.
Mar. 19, 2010 International Search Report issued in Application No. PCT/GB2009/002543.
Mar. 19, 2010 Written Opinion of the International Searching Authority issued in Application No. PCT/GB2009/002543.
Mar. 18, 2009 British Search Report issued in Application No. GB0822356.2.
Dec. 21, 2009 International Search Report issued in Application No. PCT/GB2009/002745.
Dec. 21, 2009 Written Opinion of the International Searching Authority issued in Application No. PCT/GB2009/002745.
Mar. 16, 2009 British Search Report issued in Application No. GB0822254.9.
Sep. 23, 2010 International Search Report issued in Application No. PCT/GB2009/002802.
Sep. 23, 2010 Written Opinion of the International Searching Authority issued in Application No. PCT/GB2009/002802.
Mar. 16, 2009 British Search Report issued in Application No. GB0822253.1.
Apr. 7, 2010 International Search Report issued in Application No. PCT/GB2009/002801.
Apr. 7, 2010 Written Opinion of the International Searching Authority issued in Application No. PCT/GB2009/002801.
Jan. 25, 2010 British Search Report issued in Application No. GB0917060.6.
Mar. 21, 2011 International Search Report issued in Application No. PCT/GB2010/001811.
Mar. 21, 2011 Written Opinion of the International Searching Authority issued in Application No. PCT/GB2010/001811.
Jun. 29, 2010 British Search Report issued in Application No. GB0917060.6.
Jun. 1, 2011 International Search Report issued in Application No. PCT/GB2010/001811.
Jun. 1, 2011 Written Opinion issued in Application No. PCT/GB2010/001811.
U.S. Appl. No. 12/993,146 in the name of Hicks et al., filed Nov. 17, 2010.
U.S. Appl. No. 12/993,098 in the name of Wiseman et al., filed Nov. 17, 2010.
U.S. Appl. No. 12/992,695 in the name of Wiseman et al., filed Nov. 15, 2010.
U.S. Appl. No. 13/130,944 in the name of Benton et al., filed May 24, 2011.
U.S. Appl. No. 13/130,897 in the name of Wiseman et al., filed May 24, 2011.
U.S. Appl. No. 13/125,735 in the name of Wiseman et al., filed Apr. 22, 2011.
Benabid, "Hollow-core Photonic Bandgap Fibre: New Light Guidance for New Science and Technology," Philosophical Transactions of the Royal Society, 2006, pp. 3439-3462, vol. 364, Bath, U.K.
Bennett et al. "Quantum Cryptography: Public Key Distribution and Coin Tossing," International Conference on Computers, Systems & Signal Processing, Dec. 10-12, 1984, Bangalore, India.
Bennett, "Quantum Cryptography Using Any 2 Non-orthogonal States," Physical Review Letters, May 25, 1992, pp. 3121-3124, vol. 68, No. 21.
Bennett et al., "Generalized Privacy Amplification," IEEE Transactions on Information Theory, 1995, pp. 1915-1923, vol. 41, No. 6.
Gilbert et al., "Secrecy, Computational Loads and Rates in Practical Quantum Cryptography," Algorithmica, 2002, pp. 314-339, vol. 34, US.
Le et al. "Enhancement of AGT Telecommunication Security using Quantum Cryptography," Ecole Nationale Superieure des Telecommunications, Eurocontrol CARE Project, QCRYPT, France.
Lütkenhaus, "Estimates for Practical Quantum Cryptography," Helsinki Institute of Physics, Feb. 1, 2008, pp. 1-26, Helsinki, Finland.
May 31, 2012 Search Report and Written Opinion issued in International Application No. PCT/GI32011/001670.
Aug. 1, 2012 Office Action issued in U.S. Appl. No. 12/993,098.
Aug. 15, 2012 Office Action issued in U.S. Appl. No. 12/863,483.
Sep. 12, 2012 Office Action issued in U.S. Appl. No. 12/863,509.
Jun. 21, 2012 Office Action issued in U.S. Appl. No, 12/863,510.
Sep. 21, 2012 Office Action issued in U.S. Appl. No. 12/812,849.
Oct. 4, 2012 Office Action issued in U.S. Appl. No. 12/992,695.
U.S. Appl. No. 13/496,324 in the name of Ayling, filed on Mar. 15, 2012.
U.S. Appl. No. 12/863,483 in the name of Wiseman, filed on Jul. 19, 2010.
U.S. Appl. No. 12/863,509 in the name of Jenkins, filed on Jul. 19, 2010.
Oct. 29, 2012 Office Action issued in U.S. Appl. No. 12/993,146.
Nov. 8, 2012 Office Action cited in U.S. Appl. No. 12/863,510.
Rass, S., "A Method of Authentication for Quantum Networks", PWASET, vol. 12, Mar. 2006; ISSN 1307-6884, pp. 149-154.
Nov. 16, 2012 Office Action issued in U.S. Appl. No. 13/130,897.
Jan. 3, 2013 Office Action issued in U.S. Appl. No. 13/125,735.
Jan. 18, 2013 Office Action issued in U.S. Appl. No. 12/993,098.
Feb. 11, 2013 Notice of Allowance issued in U.S. Appl. No. 12/863,483.
Mar. 13, 2013 Office Action issued in U.S. Appl. No. 12/992,695.
Apr. 11, 2013 Office Action issued in U.S. Appl. No. 13/130,944.
May 10, 2013 Office Action issued in U.S. Appl. No. 13/130,897.
Apr. 30, 2013 Translation of Office Action cited in Japanese Patent Application No. 2010-543567.
Ibrahim et al., "Simulation of Static Optical XPM in Active MMI Couplers," (published in International Conference on Numerical Simulation of Optoelectronic Devices, Sep. 2007), pp. 95-96.
Jul. 3, 2013 Office Action issued in U.S. Appl. No. 12/993,098.
Jun. 19, 2013 Notice of Allowance issued in U.S. Appl. No. 12/993,146.
Jun. 11, 2013 Office Action issued in U.S. Appl. No. 12/863,509.
Jul. 8, 2013 Office Action issued in US. Appl. No. 13/496,324.
Aug. 29, 2013 Office Action issued in U.S. Appl. No. 12/992,695.
Sep. 12, 2013 Office Action issued in U.S. Appl. No. 13/130,897.
Sep. 18, 2013 Office Action issued in U.S. Appl. No. 12/812,849.
Nov. 5, 2013 Office Action issued in U.S. Appl. No. 12/863,510.
Nov. 7, 2013 Office Action issued in U.S. Appl. No. 12/993,098.
Lijun Ma, "Experimental Demonstration of an Active Quantum Key Distribution Network with Over Gbps Clock Synchronization," IEEE Communications Letters, vol. 11, No. 12, Dec. 2007, pp. 1019-1021.

\* cited by examiner

METHOD OF ESTABLISHING A QUANTUM KEY FOR USE BETWEEN NETWORK NODES

The invention relates to the field of quantum cryptography generally, and more particularly to performing quantum cryptography over a distributed network.

In an example of quantum cryptography two end-points, or end-nodes, wish to communicate securely by establishing a quantum key with which to encrypt communications passing between them. To establish the quantum key, one end-node passes a quantum signal to the other end-node over a quantum channel, and following an exchange of messages over a classical channel a quantum key is agreed. Quantum communications exchanged between the nodes may be based on any one of a variety of known protocols, for example the so-called BB84 or B92 protocols, or the so-called six-state protocol or any of its variants. An important advantage of using a quantum-cryptographic scheme for encrypting communications passing between the end-nodes is that an eavesdropper may be detected as a result of the quantum-mechanical principle that making an observation of a system in a superposition of states inevitably affects the state of the system.

In order to prevent a so-called 'man-in the-middle attack', in which an intercepting node arranges a quantum key with each end-node separately and without the knowledge of either end-node, the process of agreeing a quantum key may be followed by an authentication step in which each end-node is required to prove its identity to the other end-node. If the end-nodes share an authentication key, then the authentication step may be performed by each end-node encrypting a message using the authentication key and passing the resultant encrypted message to the other end-node. For example, the messages exchanged on the classical channel may be encrypted using the shared authentication key.

Practical considerations involved in quantum cryptography place an upper limit on the length of any given quantum channel. A practical arrangement for sending messages encrypted using a quantum cryptographic scheme may therefore take the form of a network of nodes in which adjacent nodes are separated by a distance appropriate to the sending of quantum signals between these adjacent nodes. Certain schemes for providing end-to-end quantum encryption of messages from a starting-node to an end-point node require respective quantum keys to be established between the starting node and every intermediate node between the starting-node and the end-node. For example, in one scheme, a quantum key is established between a starting node and a given node by passage of a quantum signal from the given node to the previous node. The contents of the quantum signal are passed from the previous node to the starting-node using a quantum key established between the starting node and the previous node. A key agreement step is then carried out directly between the starting-node and the given node. Before the agreed quantum key may be used, an authentication step is carried out by the starting node and the given node using an authentication key shared by these two nodes. In terms of duration, the sending of the quantum signal (including error correction) and the key agreement step take significantly more time than the authentication step. Following establishment of a quantum key between the starting node and the end-node, and authentication, a traffic key for end-to-end encryption of data passed between end-nodes is passed from the starting node to the end-point node, the traffic key being encrypted using the quantum key.

The number of authentication keys that must be stored by a general node in a network may be limited by only allowing certain nodes—Key Management Centres (KMCs)—to act as starting nodes, i.e. nodes from which encrypted messages may be sent to end-nodes. Each KMC stores a set of authentication keys, each authentication key being shared between the KMC and a respective network node. The KMCs may share the workload of authenticating each node in the network.

The process explained above whereby a given node (not adjacent a KMC) establishes a quantum key with a starting node (a KMC) by carrying out a key agreement step and an authentication step directly with the KMC is disadvantageous because another node may only start to establish a quantum key with the KMC after the first node has agreed a quantum key with the KMC and subsequently authenticated with the KMC. In a network having a significant size (i.e. a significant number of nodes), this method of establishing quantum keys between general nodes and a KMC is therefore slow and inefficient because the establishment of quantum keys between respective nodes and a KMC is performed serially.

The present invention provides a method of establishing a quantum key for use by first and second network nodes, the method comprising a key agreement step and an authentication step, and wherein the key agreement step is performed by the second network node and a third network node, and the authentication step is subsequently performed by the first and second network nodes.

Thus, according to the invention, a quantum key for use between the first and second network nodes is agreed by the second and third network nodes, i.e. without the first network node taking part in the key agreement step. Subsequently, establishment of the quantum key is completed by an authentication step carried out directly between the first and second nodes. The invention therefore allows multiple quantum keys to be agreed simultaneously (or at least in partially coincident time periods), each quantum key being for use between a first network node and one of a group of other network nodes, but without the first network node taking part in agreeing any of the quantum keys. Only when all quantum keys have been agreed is an authentication step carried out between the first network node and each of the group of other nodes, in order to complete establishment of the quantum keys. The invention thus provides at least some parallelism in establishing quantum keys within a network, allowing quantum keys to be established more quickly.

If in the key agreement step the second and third network nodes exchange messages over a classical channel, then the authentication step may be carried out by a process in which (i) said messages are passed from the third network node to the first network node;
(ii) the first and second network nodes each locally generate a cryptographic hash of said messages using an authentication key shared by the first and second network nodes;
(iii) the first and second network nodes exchange the cryptographic hashes generated in (ii) so that each receives a cryptographic hash from the other;
(iv) received and locally-generated cryptographic hashes are compared at each of the first and second network nodes.

The third network node may lie on a path between the first and second network nodes, for example the third network node might be the node immediately before the second network node on a path between the first and second network nodes. The first network node could be key management centre (KMC).

A second aspect of the invention provides a method of establishing a first quantum key for use between a first network node and a second network node, and a second quantum key for use between the first network node and a third network node, wherein the method comprises a key agreement step in which the first and second quantum keys are agreed between the second network node a fourth network node and between the third network node a fifth network node respectively, and in at least partially coincident time periods, and wherein the method further comprises a subsequent authentication step in which authentication is performed between the first and second network nodes and between the first and third network nodes. The first network node may be a key management centre (KMC).

The first and second quantum keys are therefore agreed with at least some degree of parallelism, as the agreement of these quantum keys does not involve the first network node. Authentication of the first network node with each of the second and third network nodes takes place subsequent to the agreeing of the first and second quantum keys. This provides rapid establishment of the two quantum keys because the agreement of the two quantum keys is carried out at least partly in parallel.

Embodiments of the invention are described below with reference to the accompanying drawings in which.

Figure 1:
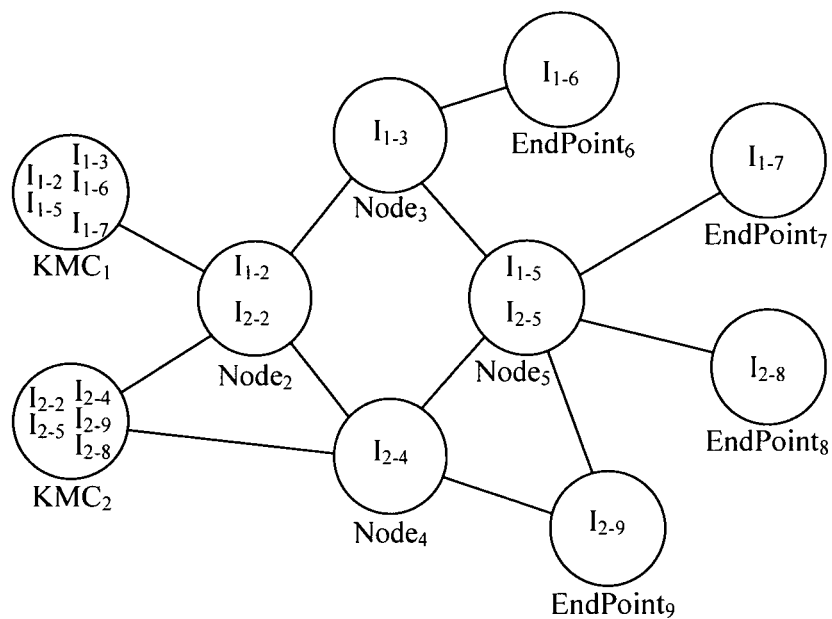
FIG. 1 shows a network suitable for secure communication by use of quantum keys.

FIG. 1 shows a network for performing quantum cryptography, in this particular case for passing encrypted messages from either of two starting nodes (Key Management Centres, KMCs) KMC1, KMC2 to any of four end-point nodes EndPoint6, EndPoint7, EndPoint8, EndPoint9 via intermediate nodes Node2-5. A traffic key is used for encryption of data passed between end-point nodes; this key is supplied from a KMC to each end-point node in a form encrypted using a quantum key agreed between the KMC and the end-point node. This quantum key may be established by process in which respective quantum keys are agreed between the KMC and every other node in a path between the KMC and the end-point node. For example, in order to establish a quantum key between KMC1 and EndPoint6, quantum keys are established between KMC1 and Node2, between KMC1 and Node3 and finally between KMC1 and EndPoint6. In order to establish a quantum key between a KMC and a given node in a path between that KMC and an end-point node, a quantum signal may be passed from the given node to the previous node in the path, and the information in that quantum signal passed from the previous node to the KMC using a quantum key established between the previous node and the KMC. A key agreement step may then take place between the given node and the KMC to establish a quantum key between these two nodes. This piecemeal approach to establishing a quantum key between a KMC and an end-point node overcomes the problem that the distance between adjacent nodes in the network is limited by practical considerations relating to the maximum distance over which a quantum signal may be sent.

Figure 2:
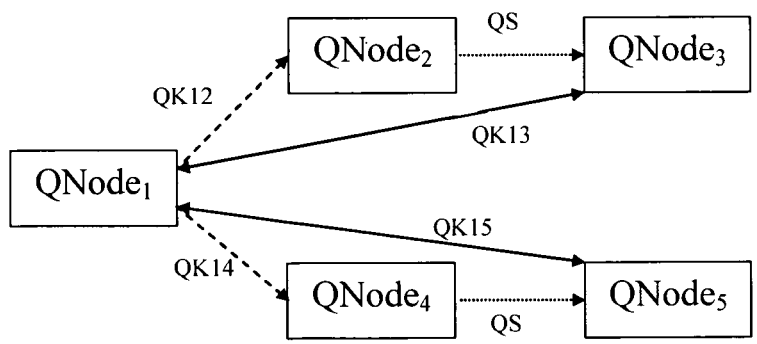
FIG. 2 illustrates a method of establishing quantum keys in a network by a serial process.

FIG. 2 shows a network of five network nodes QNode1-5 in which a starting node QNode1 is connected to an end-node QNode3 via an intermediate node QNode2, and also to and end-node QNode5 via an intermediate node QNode4. In order to establish a quantum key QK13 between QNode1 and QNode3 (for example so that a traffic key may be securely passed from QNode1 to QNode3) a quantum key QK12 may first be established between QNode1 and QNode2. Subsequently a quantum signal QS may be passed between QNode2 and QNode3 the details of which are passed to QNode1 using QK12. Key agreement and authentication may then take place directly between QNode1 and QNode3 to establish QK13. In the same way, a quantum key QK15 for use between QNode1 and QNode5 may be established by first establishing a quantum key QK14 for use between QNode1 and QNode4. Establishment of quantum keys QK13, QK15 may thus be performed serially.

Figure 3:
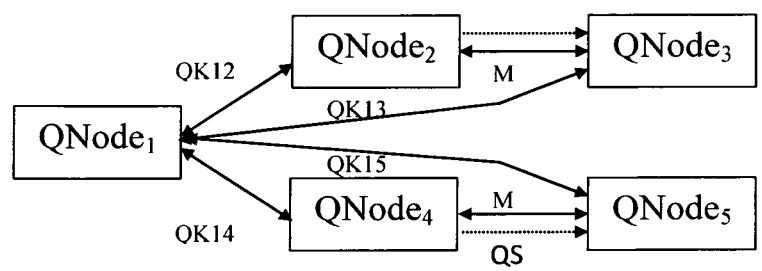
FIG. 3 illustrates a method of the invention in which quantum keys are established in a network by a process in which key agreement is carried out in parallel.

FIG. 3 illustrates establishment of quantum keys QK13 and QK15 by a method of the present invention, assuming that quantum keys QK12 and QK14 have already been established. A quantum signal is passed between QNode2 and QNode3 on a quantum channel, followed by an exchange of messages M over a classical channel to agree the key QK13. At the same time, a quantum signal is passed between QNode4 and QNode5 and an exchange of messages between these two nodes occurs to agree QK15. Thus quantum keys QK13, QK15 are agreed locally using QNode2 and QNode4 as proxies. Subsequently, QNode 1 and QNode3 perform authentication and QNode1 and QNode5 perform authentication so that establishment of QK13 and QK15 may be completed and used in the knowledge that there is no 'man-in-the-middle' (intercepting) node.

Figure 4:
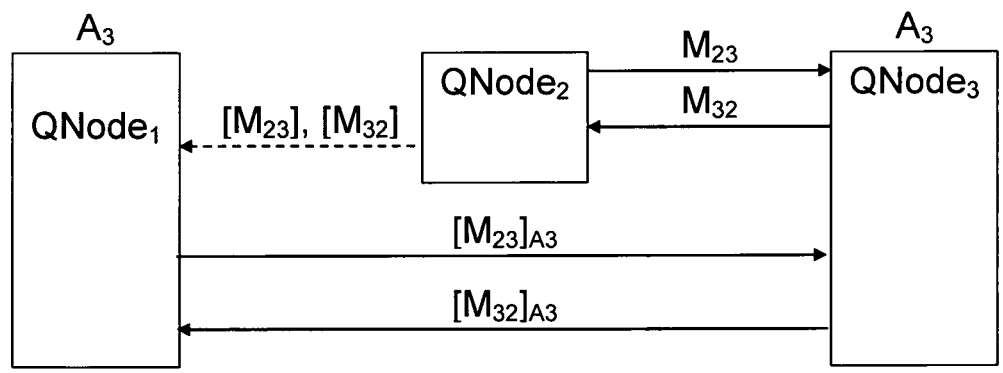
FIG. 4 illustrates an authentication process between nodes of the FIG. 3 network.

FIG. 4 illustrates how authentication is performed between QNode1 and QNode3, a similar process being used to perform authentication between QNode1 and QNode5. Messages M23, M32 which are exchanged by QNode2 and QNode3 when agreeing QK13 are recorded by QNode3 and also passed to QNode1 by QNode2 in encrypted form using QK12. At QNode1, a cryptographic hash of the messages M23, M32 is locally generated using an authentication key A3 shared by QNode1 and QNode3; the same occurs at QNode3. QNode1 and QNode3 then exchange cryptographic hashes and compare the hashes they receive upon such exchange with the hashes they generate locally. If the values of the hashes locally generated and received by exchange are the same each of QNode1 and QNode3 are assured that other has the authentication key A13. The quantum key QK13 may then be used to update the authentication key A13 if required.

The agreement of quantum keys QK13, QK15 occurs simultaneously or at least these keys are agreed in partially coincident time periods so that there is some degree of parallelism. Parallelism is achieved because QNode1 is not involved in the agreement of the quantum keys QK13, QK15. Once QK13, QK15 have been (locally) agreed, QNode1 mutually authenticates with QNode3 and subsequently with QNode5, each authentication taking place as described above so that QK13, QK15 may be securely used (e.g. to encrypt a traffic key).

Figure 5:
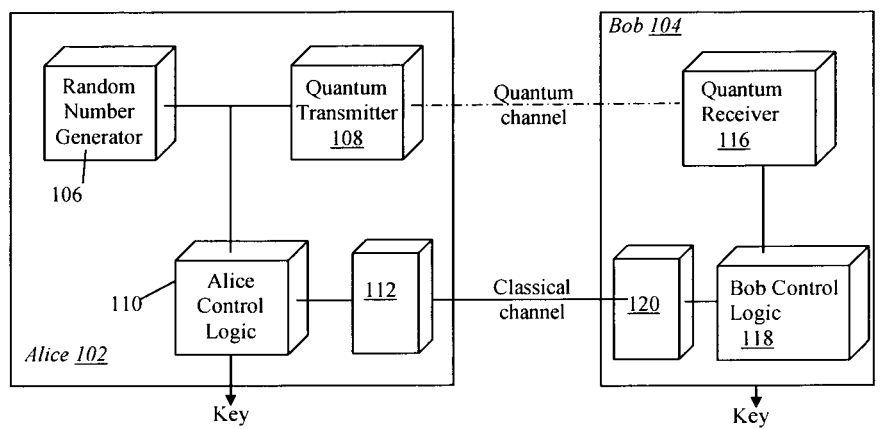
FIG. 5 shows a standard quantum-cryptographic transmitter (Alice) and receiver (Bob) arranged over a single optical link.

Referring to FIG. 5 the basic hardware structure of a standard QKD system is shown. Unit 102 comprises a quantum transmitter, typically referred to as Alice, and is optically linked to unit 104 comprising a quantum receiver, typically referred to a Bob. The optical link may be through free space or any suitable waveguide but for illustration will be described herein as being a fibre optic link. A typical Alice unit compromises a random number generator 106, quantum transmitter 108, controlling logic 110 and classical transceiver 112. The quantum transmitter 108 produces a series of single photons, each photon being randomly encoded using a value produced by the random number generator. There are a number of different known encoding protocols and a number of suitable transmitters which could be used for QKD and hence these aspects will not be described further. For the purposes of this description a BB84 type protocol will be assumed wherein one of two encoding bases is chosen at random for each photon and the photon is randomly encoded with a data value of 1 or 0 in the chosen encoding base. The data regarding the applied encoding base and data value for each photon is passed to the Alice control logic 110.

The series of encoded single photons are transmitted through the fibre optic to the Bob unit 104. A typical Bob unit comprises a quantum receiver 116 which randomly chooses an encoding base with which to measure the photon and then determines a data value for the photon in the chosen base. The output of the quantum receiver 116, which indicates the applied encoding base and measured value for each detected photon is passed to Bob control logic 118.

Alice control logic 110 and Bob control logic 118 then communicate with each other via classical transceivers 112 and 120 respectively to establish a common shared quantum key as is well known. Note as used herein the term logic means any suitable device arrangement for performing the key agreement protocols. The control logic may be a suitably designed ASIC or a suitably programmed FPGA. The control logic could also be a suitably programmed microprocessor.

In establishing a common shared quantum key, Alice control logic 110 and Bob control logic 118 mutually authenticate each other (in order to exclude the possibility of a man-in-the-middle attack) by means of a shared authentication key.

Having used QKD to establish a quantum key, and mutually authenticated each other, Alice control logic 110 and Bob control logic 118 use that value in part to update the shared authentication key and in whole or part as a quantum key for encrypting subsequent communication between them.

Figure 6:
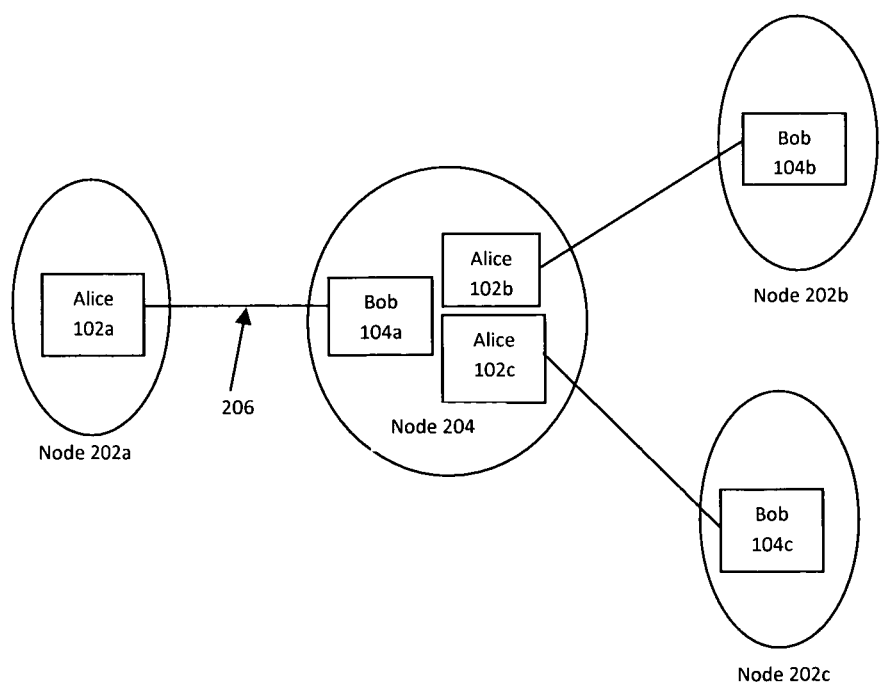
FIG. 6 shows how transmitters and receivers of the type shown in FIG. 5 may be used to form a network.

FIG. 6 illustrates how a simple network may be implemented in hardware. The network shown in FIG. 9 consists of three endpoint nodes 202*a-c*, each linked via a fibre optic link 206 with an intermediate (switching) node 204. The intermediate node 204 comprises an active switch (not shown) which can receive optical data on the link from any node and retransmit that data out to any node.

Node 202*a* comprises an Alice unit 102*a* arranged in communication over the fibre link 206 with a Bob unit 104*a* within the intermediate node 204. The Alice and Bob units may be the same as described above with reference to FIG. 5. The intermediate node 204 also comprises Alice units 102*b* and 102*c* arranged in communication with Bob unit 104*b* in node 202*b* and Bob unit 104*c* in node 202*c* respectively.

In use suppose node 202*a* wishes to communicate with node 202*b* but wants to keep the communication secret from eavesdroppers and protect against it being delivered to node 202*c* by mistake. This may be achieved as follows. Node 202*a* may establish a first quantum key with switching node 204 by QKD and authenticate this quantum key with intermediate node 204 to ensure that it is indeed communicating with the intermediate node 204. This authentication is based on an authentication key shared by node 202*a* and intermediate node 204.

Node 202*a* may then instruct intermediate node 204 to transmit a series of single photons from Alice 102*b* to node 202*b* and, once the quantum transmission has occurred to tell node 202*a* what was sent. The communication between intermediate node 204 and node 202*a* is encrypted using the first quantum key to protect it from eavesdropping. Once it is aware of what quantum signal was transmitted node 202*a* undertakes an open classical communication with node 202*b*, via the intermediate node 204, to establish a quantum key as described above. Further, node 202*a* authenticates the key based on an authentication key known only to it a node 202*b*. In this way node 202*a* has confidence that it is talking to node 202*b* and does not need to trust intermediate node 204. Part of the agreed quantum key may be used as an authentication key shared between 202*a* and 202*b* and the rest can form a quantum key which can be used for end-to-end encryption between these two nodes.

Had the switching node mistakenly thought that node 202*a* wanted to talk to node 202*c* it might have instead transmitted a quantum signal from Alice unit 102*c* to node 202*c* and subsequently directed the classical communication of node 202*a* which is part of the key agreement step to node 202*c*. In such an event however the authentication step would fail because node 202*c* would not have the correct identity key.

If node 202*b* wanted to communicate with node 202*a* and they needed a new key it could simply ask node 202*a* to repeat the process. However it could establish the key itself by essentially performing the same process in reverse, i.e. it contacts intermediate node 204 to indicate it wishes to establish a quantum key with node 202. As a first stage Alice unit 102*b* of the intermediate node transmits a quantum signal to node 202*b* which they discuss to agree a quantum key, authenticating as usual. This time it is node 202*b* authenticating and hence the relevant authentication key used by intermediate node 204 is different. Having established this quantum key, Alice 102*a* is instructed to transmit a quantum signal to Bob 104*a* in the intermediate node.

The intermediate node then sends details of each photon received to node 202*b* which then performs a key agreement step with 202*a*. Assuming everything is in order nodes 202*b* and 202*a* authenticate and agree the new quantum key for subsequent communications.

It is also possible for node 202*b* to agree a key with node 202*c* if desired. A first quantum key is established with intermediate node 204 as described above. Then Alice unit 102*c* sends a quantum signal to Bob unit 104*c* in node 202*c*, the details of which are sent by the intermediate node to node 202*b* using the first quantum key. Node 202*b* then undergoes a key agreement step with node 202*c* to agree a second quantum key, once 202*b* and 202*c* have mutually authenticated.

The invention claimed is:

1. A method of establishing a quantum key for use by first and second network nodes, the method comprising a key agreement step and an authentication step, and wherein the key agreement step is performed by the second network node and a third network node, and the authentication step is subsequently performed by the first and second network nodes, wherein in the key agreement step the second and third network nodes exchange messages over a classical channel, and in the authentication step:

[i] said messages are passed from the third network node to the first network node;

[ii] the first and second network nodes each locally generate a cryptographic hash of said messages using an authentication key shared by the first and second network nodes;

[iii] the first and second network nodes exchange the cryptographic hashes generated in [ii] so that each receives a cryptographic hash from the other;

[iv] received and locally-generated cryptographic hashes are compared at each of the first and second network nodes.

2. A method according to claim 1 wherein the third network node is disposed on a path between the first and second network nodes.

3. A method according to claim 1 wherein the first network node is a key management centre (KMC).

4. A method of establishing a first quantum key for use between a first network node and a second network node, and a second quantum key for use between the first network node and a third network node, wherein the method comprises a key agreement step in which the first and second quantum keys are agreed between the second network node and a fourth network node and between the third network node and a fifth network node respectively and in at least partially overlapping time periods, and wherein the method further comprises a subsequent authentication step in which authentication is performed between the first and second network nodes and between the first and third network nodes, wherein in the key agreement step the second and fourth network nodes and the third and fifth network nodes exchange messages over a classical channel, and in the authentication step:

[i] said messages passed between the second and fourth network nodes are passed from the fourth network node to the first network node, and said messages passed between the third and the fifth network nodes are passed from the fifth network node to the first network node;

[ii] the first and second network nodes each locally generate a cryptographic hash of said messages passed between the second and fourth network nodes using an authentication key shared by the first and the second network nodes and, the first and third network nodes each locally generate a cryptographic hash of said messages passed between the third network nodes and fifth network nodes using an authentication key shared by the first and third network nodes;

[iii] the first and second network nodes, and the first and third network nodes exchange the cryptographic hashes generated in [ii] so that each receives a cryptographic hash from the other;

[iv] received and locally-generated cryptographic hashes are compared at each of the first and second network nodes and first and third network nodes.

5. A method according to claim 4 wherein the first network node is a key management centre (KMC).

* * * * *